United States Patent [19]

Davis et al.

[11] Patent Number: 4,657,101

[45] Date of Patent: Apr. 14, 1987

[54] PARASOL DESIGN FOR TRANSVERSELY SUPPORTED MEMBRANE SEAL

[75] Inventors: Sydney Davis, Jerusalem, Israel; Alexander Malakhoff, Arlington, Va.

[73] Assignee: U.S. Dept. of Navy, Bethesda, Md.

[21] Appl. No.: 744,592

[22] Filed: Jun. 13, 1985

[51] Int. Cl.$^4$ .............................................. B60V 1/16
[52] U.S. Cl. ................................................ 180/127
[58] Field of Search ............ 180/127, 128; 114/67 A

[56] References Cited

U.S. PATENT DOCUMENTS

| | | | |
|---|---|---|---|
| 4,056,645 | 11/1977 | Henry | 428/65 |
| 4,236,593 | 12/1980 | Wheeler | 180/128 |
| 4,254,842 | 3/1981 | Malakhoff | 180/116 |
| 4,285,414 | 8/1981 | Malakhoff et al. | 180/126 |
| 4,312,690 | 1/1982 | Wheeler | 156/253 |
| 4,333,413 | 6/1982 | Davis et al. | 180/127 |
| 4,337,106 | 6/1982 | Wheeler | 156/228 |
| 4,436,312 | 3/1984 | Davis et al. | 277/126 |

*Primary Examiner*—John A. Pekar
*Attorney, Agent, or Firm*—Robert F. Beers; Luther A. Marsh

[57] ABSTRACT

The purpose of this invention is to improve the life of transversely stiffened membrane (TSM) seals. To this end the inventors have introduced a segmented glass reinforced plastic (GRP) plank into the lower stiffened lobe portion, which is positioned beneath the bag segments of the TSM seal. The segmented (GRP) planks consist of planks separated by rubber spacers and sandwiched between two sheets of rubber coated nylon fabric.

16 Claims, 7 Drawing Figures

PARASOL DESIGN FOR TRANSVERSELY SUPPORTED MEMBRANE SEAL

The invention described herein may be manufactured and used by or for the Government of the United States of America for governmental purposes without the payment of royalties thereon or thereof.

BACKGROUND OF THE INVENTION

This invention generally relates to seal structures for Surface Effect Ships (SES) and more particularly to a seal structure which includes transverse reinforcing means for reducing weight requirements and the effects of impact loads. The invention can be used as a bow seal and, by rotating the total structure, also as a stern seal. However the advantages of this seal are more apparent when used as a bow seal. The description below applies to the invention when used in this way.

Hitherto this invention comprised an inflatable bag structure secured to the ship hull, between the vessel's sidewalls and a stiffened lobe portion transversely supported and secured beneath the bag. The lobe portion consisted of a membrane with an array of laterally arranged, longitudinally spaced transverse stiffening means secured thereto. Each transverse stiffening means was preferably segmented into a plurality of light weight elongated stiffener member which comprised glass reinforced plastic (GRP) planks.

The GRP Planks were continuous members, i.e. not segmented, and under the combined effects of air pressure and waves, these GRP planks developed high stress areas which produced cracks in the planks.

SUMMARY OF THE INVENTION

The laterally supported stiffened lobe seal structure for SES overcomes many drawbacks heretofore encountered. This is accomplished by the introduction of a segmented GRP plank in place of the continuous GRP plank used hitherto. The segmented GRP plank greatly improves the life of the seal. The new plank design comprises GRP planks separated by rubber spacers. These segmented planks are then sandwiched between two sheets of rubber coated nylon fabric and bonded to the segmented GRP planks.

BRIEF DESCRIPTION OF THE DRAWINGS

A more complete appreciation of the invention and many of the attendant features thereof will be readily appreciated as the same becomes better understood by reference to the following detailed description when considered in connection with the accompanying drawings wherein.

DESCRIPTION OF THE PREFERRED EMBODIMENT

Figure 1:
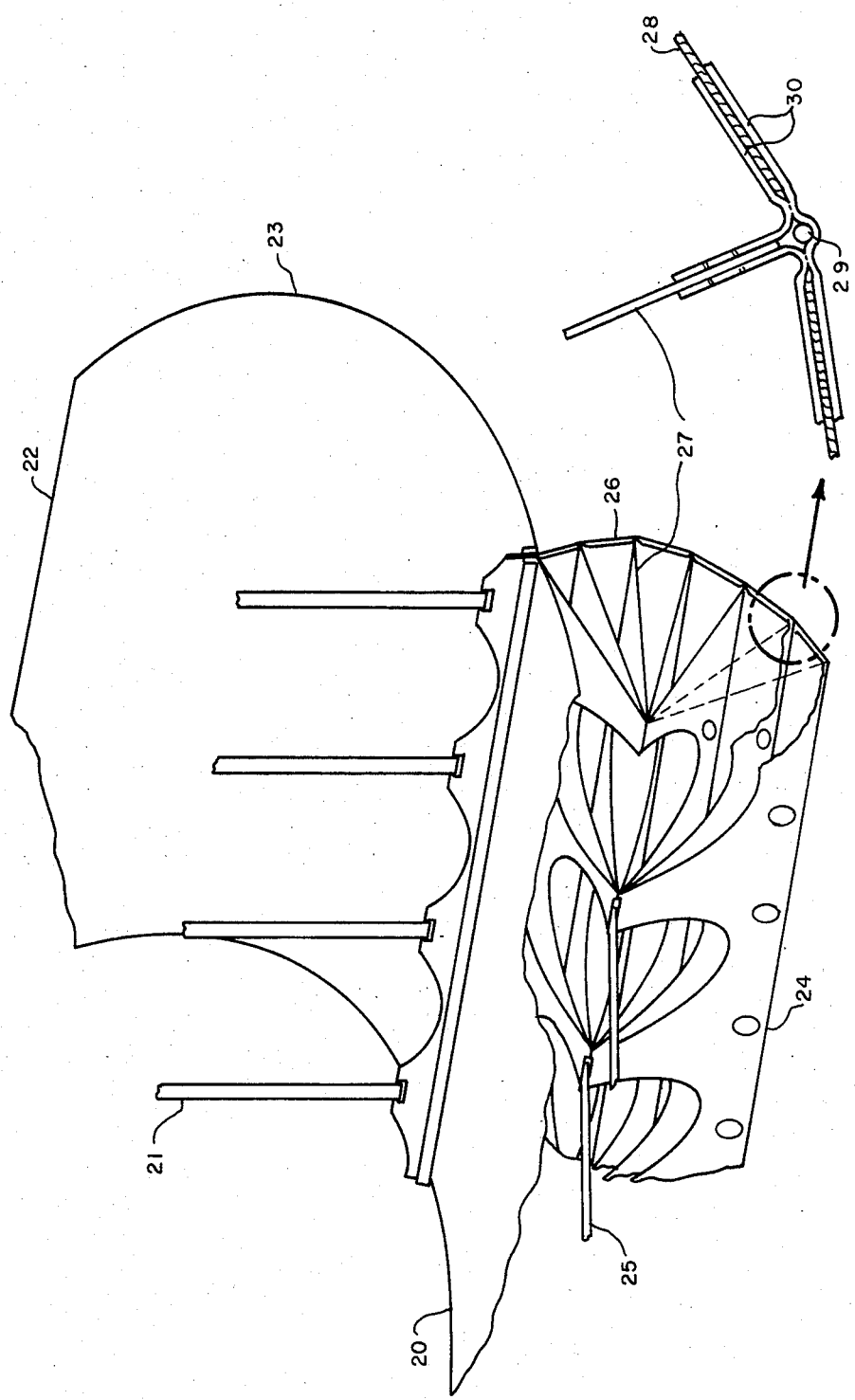
FIG. 1 shows generally the concept of the transversely stiffened membrane seal.

Referring now to the drawings wherein like reference characters designate identical or corresponding parts throughout the several views.

The Transversely Supported Membrane seal, hereinafter TSM seal, is illustrated in FIG. 1. Reference numerals 20 and 23 refer to the inner and outer loops of the bag structure which are fixedly attached to the hull structure (not shown) by appropriate means 22. A seal retraction strap 21 adds further support to the bag structure.

A lower stiffened lobe portion, generally at 26, is positioned beneath the bag segments 20 and 23. Attached to the stiffened lobe portion 26 is a rearward support means in the form of a plurality of positioning elements 27 which not only provide support for the individual sections of the lobe portion 26 but also establish a predetermined operating configuration for the lobe portion 26. For example, under the influence of cushion pressure, the lobe portion 26 is biased outwardly until the individual positioning elements 27 are fully extended. The positioning elements 27 are connected to adjustable retracting straps 25 which serve to orient the lobe portions 26 to accommodate a variety of sea state conditions.

Adjustment of the retracting straps 25 is generally accomplished by rotating a rod means (not shown) which can be attached to all of the retracting straps 25. Forward support means for the stiffened lobe portions 26 is provided by the membrane 30.

The stiffened lobe portion 26 comprises transversely arranged stiffener members 28 or glass reinforced plastic planks (hereinafter GRP planks) which are interposed between the materials forming the membrane 30 of the lobe portion 26. Reference numeral 24 denotes drain holes and rubber beading is shown at 29.

Generally the role of the GRP planks are to insure that when inflated, the TSM seal and lobe portions 26 will maintain a proper shape. The GRP planks 28 also provide the stiffness and mass to the lower portions of the positioning elements 27 and lobe portions 26 that eliminate flagellation, which is the main cause of TSM seal wear.

Figure 2:
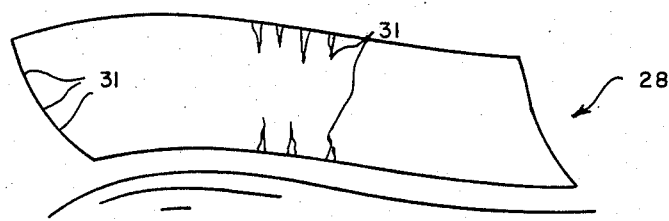
FIG. 2 discloses a continuous glass reinforced plastic plank.

The GRP planks 28 of the initial version of the TSM seal lobe portion 26 were continuous members 28 extending transversely across the seal, as illustrated in FIG. 2. Under the combined effects of air pressure and waves, the GRP planks 28 developed high stress areas 31 which produced cranks in the batten.

Figure 3:
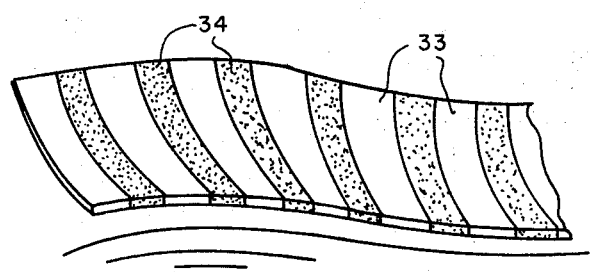
FIG. 3 illustrates the segmented glass reinforced plastic plank.
Figure 4:
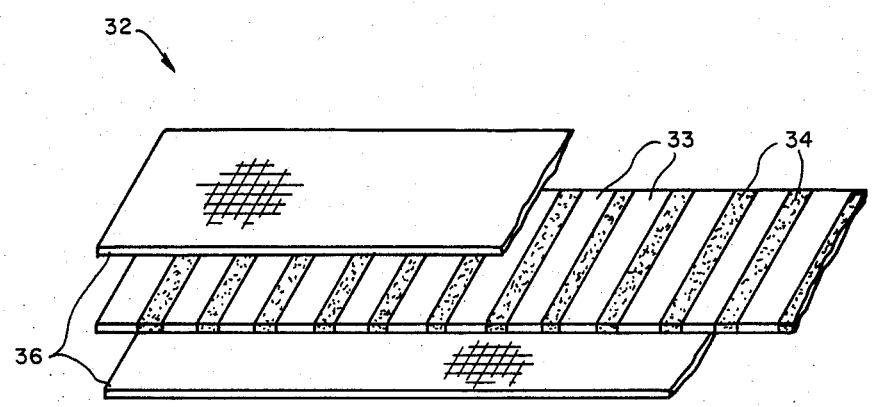
FIGS. 4 and 5 show the segmented glass reinforced plastic plank sandwiched between two fabric sheets, with the FIG. 5 planks being perforated.
Figure 5:
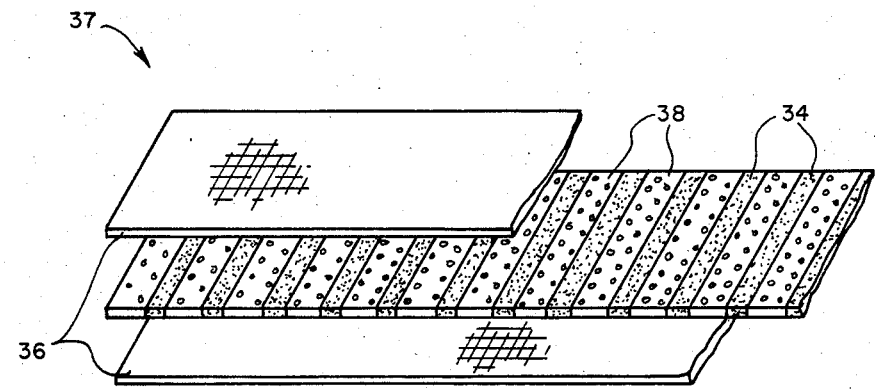

The inventors now introduce a segmented GRP plank 32, in FIG. 3, that eliminates the high stress areas 31 and consequently greatly improve the life of the TSM seal. The planks are generally thin (0.06–0.010 inches) glass reinforced plastic planks. During more than fifty hours of operations the segmented GRP plank 32 showed no signs of stress damage. By comparison, the continuous GRP plank 28 used in the earlier design, began cracking after less than five hours of operations.

The new segmented GRP plank 32 consists of thin glass reinforced plastic planks 33 separated by rubber spacers 34 and sandwiched between two sheets of rubber coated nylon fabric 36. The fabric 36 is bonded to the segmented GRP planks 33, rubber spacers 34 and positioning elements 27.

The segmented GRP plank configuration 32 permits the planks to perform as simple two-dimensional beam members. The planks are now free to warp and bend without producing high strains as in the earlier continuous GRP plank 28. Also the rubber spacers 34 and the sandwich construction result in a highly dampened and cushioned system which tends to reduce the deleterious affect of water impact and flagellation. Experience with testcraft has shown that, whereas the continuous GRP plank 28 developed cracks after a few hours of operation, the new segmented GRP plank 32 successfully withstood more than fifty hours of operation at speeds higher than thirty knots.

Some other schemes for the segmented GRP planks 32 have also been developed. One such alternative is integrating stiffening members, planks or rods (not shown) into the weave of the Fabric 36, after which the fabric 36 is coated by an elastomer (not shown) and then cured. This will produce a lighter segmented GRP plank construction.

Another alternative would be fabricating the planks from high stiffness and strength fibers such as carbon. The fibers may be woven into the fabric, coated with an elastomer and cured.

Figure 6:
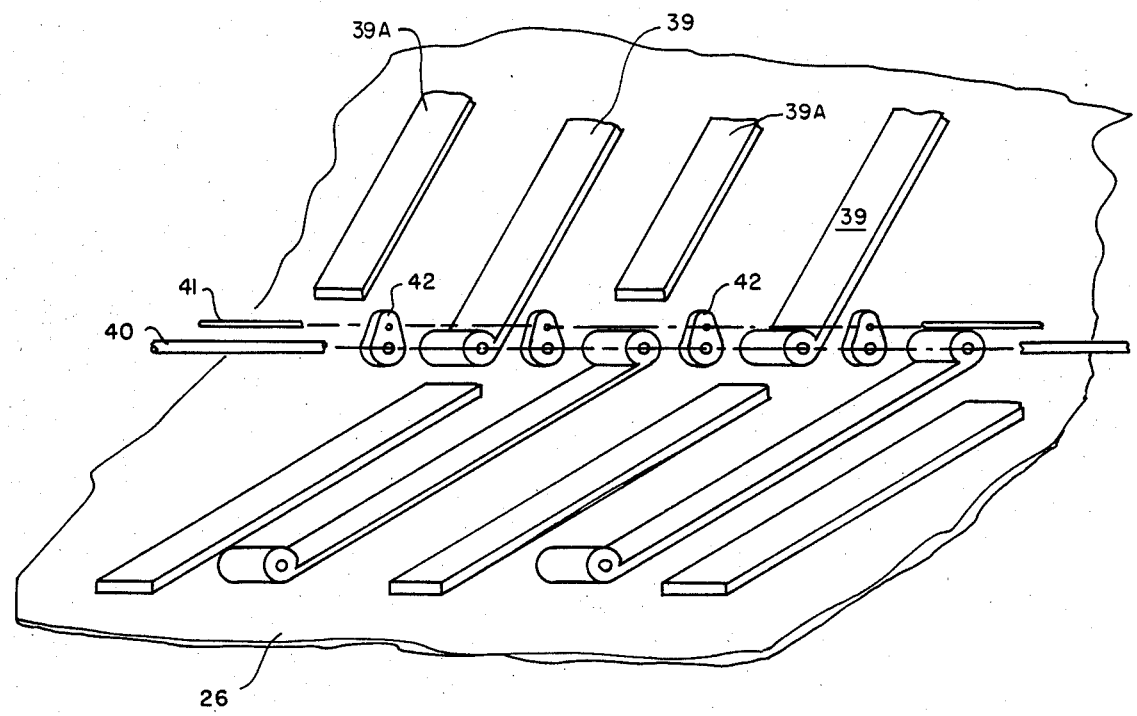
FIGS. 6 and 7 illustrate a design wherein the planks of the seal structure are hinged to a washer means and ultimately connected to the ship hull.
Figure 7:
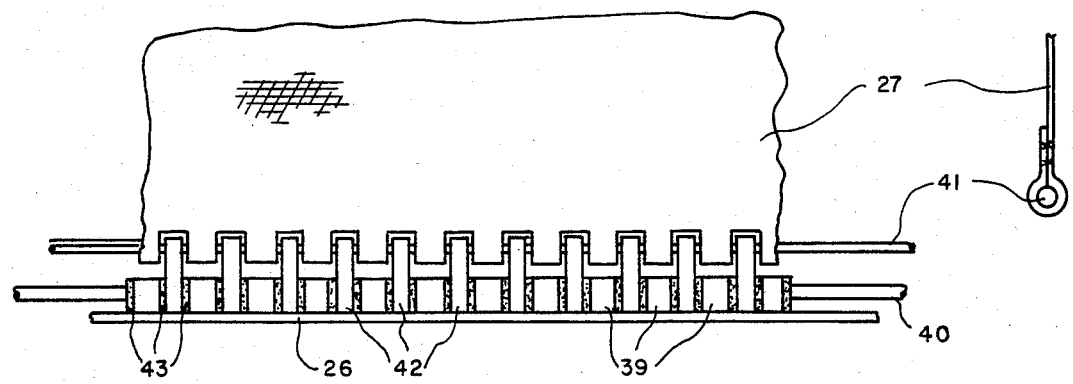

FIGS. 6 and 7 illustrate a design wherein the planks of the seal structure are hinged to a washer means and ultimately connected to the ship hull.

The junction formed by two adjacent GRP planks acts essentially as a hinged system. This junction is operatively connected to the hull through positioning elements 27. In order to provide a more durable junction system, a more elaborate design such as is shown in FIGS. 6 and 7 was developed.

This design consists of thin GRP planks, or carbon fiber planks, 39, the ends of which are formed to accommodate hinge rod 40 in a pivotal manner, i.e. the fixed hinge rod 40 acting as an axis means provides pivotal support for 39. The GRP planks 39 alternate with unhinged GRP planks 40. The space that left between the two adjacent planks 32 can be filled with elastomer spacing means (not shown). The hinged rod 40 is of flexible construction fixedly connected on its both ends to the hull.

Next a two-hole washer 42 is pivotally mounted on hinge rod 40. The upper hole of the washer 42 accommodates hinge rod 41. Because washer 42 is pivotally mounted on hinge rod 40 the upper hole of the washer 42, in operation, will define an oscillatory path. The washer 42 being ultimately connected to the ship hull through the positioning elements 27 and 41.

Both hinge rods 40 and 41 have sufficient flexibility to accommodate lateral deflections due to asymmetrical wave action. The hinge surface areas may be coated with low friction materials such as teflon, although in the actual operational environment, these areas will probably be adequately lubricated by water.

It will be understood that variations and modifications may be effected without department from the spirit and scope of the novel concepts of this invention.

What is claimed is:

1. A seal structure for an air cushion marine vessel of the type having a hull with spaced, depending sidewalls for forming a plenum chamber therebetween comprises:
    a flexible bag secured to the hull and positioned between the sidewalls to form an expansible chamber, said bag being deformable in response to fluid pressure exerted thereon;
    a stiffened lobe portion positioned beneath said bag, said stiffened lobe portion including a membrane section and a plurality of elongated stiffener members connected to and extending transversely across said membrane section; and
    means connected to the hull for flexibly supporting said stiffened lobe portion beneath said flexible bag which support means includes at least one positioning element attached to said hull through an adjusting strap, axis means fixedly connected to said hull, oscillatory means pivotally connected about said axis means and operatively connected along its oscillatory path to said positioning element, characterized in that at least one of said elongated stiffener members is pivotally connected to said axis means.

2. The seal structure of claim 1, wherein said axis means is flexible.

3. The seal structure of claim 1, wherein said at least one of said stiffener member is pivotally connected to said axis means on both of its elongate extremities.

4. The seal structure of claim 1, wherein said at least one of said stiffener member pivotally connected to said axis means is flanked by at least one stiffener member which is not in pivotal connection with said axis means.

5. The seal structure of claim 1, wherein said at least one oscillatory means is a washer pivotally attached to said axis means on one end and operatively connected to said positioning means at its other end.

6. The seal structure of claim 1, wherein said stiffener member is segmented.

7. The seal structure of claim 1, wherein said plurality of elongated stiffener members are segmented.

8. The seal structure of claim 1, wherein said plurality of elongated stiffener members comprise planks interposed with elastomer spacers.

9. The seal structure of claim 8, wherein said plurality of elongated stiffener members comprise planks interposed with elastomer spacers which are sandwiched between coated fabric.

10. The seal structure of claim 9, wherein said planks are perforated.

11. The seal structure of claim 10, wherein said planks are composite.

12. A seal structure for an air cushion marine vessel of the type having a hull with spaced, depending sidewalls for forming a plenum chamber therebetween comprises:
    a flexible bag secured to the hull and positioned between the sidewalls to form an expansible chamber, said bag being deformable in response to fluid pressures exerted thereon;
    a stiffened lob portion positioned beneath said bag, said stiffened lob portion including a membrane section and at least one elongated stiffener member connected to said membrane section; and
    means connected to the hull for flexibly supporting said stiffened lobe portion beneaths said flexible bag; characterized in that said at least one elongated stiffener member is segmented.

13. The seal structure of claim 12, wherein said at least one elongated stiffener member comprises planks interposed with elastomer spacers.

14. The seal structure of claim 13, wherein said plurality of elongated stiffener members comprise planks interposed with elastomer spacers which are sandwiched between coated fabric.

15. The seal structure of claim 14, wherein said planks are perforated.

16. The seal structure of claim 15, wherein said planks are composite.

* * * * *